(12) United States Patent
Lloyd et al.

(10) Patent No.: US 8,229,915 B1
(45) Date of Patent: Jul. 24, 2012

(54) CONTENT ITEM ARRANGEMENT

(75) Inventors: Matthew I. Lloyd, Santa Monica, CA (US); Stanley Chen, Mountain View, CA (US); Michael Hochberg, Los Altos, CA (US)

(73) Assignee: Google Inc., Mountain View, CA (US)

( * ) Notice: Subject to any disclaimer, the term of this patent is extended or adjusted under 35 U.S.C. 154(b) by 966 days.

(21) Appl. No.: 11/868,714

(22) Filed: Oct. 8, 2007

(51) Int. Cl.
*G06F 7/00* (2006.01)
(52) U.S. Cl. ............ 707/709; 707/609; 707/705; 711/6
(58) Field of Classification Search .......... 707/723–728, 707/748–750
See application file for complete search history.

(56) References Cited

U.S. PATENT DOCUMENTS

2007/0061331 A1* 3/2007 Ramer et al. .................... 707/10
2007/0128899 A1* 6/2007 Mayer .......................... 439/152

* cited by examiner

*Primary Examiner* — Wilson Lee
*Assistant Examiner* — Tuan-Khanh Phan
(74) *Attorney, Agent, or Firm* — Fish & Richardson P.C.

(57) ABSTRACT

A determination is made as to a first series of location rankings for one or more content item locations based on content item location data. Another determination is made as to a first series of content item rankings for one or more content items based on content item data. One of the content items having a first content item ranking is associated with one of the content item locations having a first location ranking.

44 Claims, 6 Drawing Sheets

CONTENT ITEM ARRANGEMENT

FIELD OF THE INVENTION

This disclosure relates to content item arrangement.

BACKGROUND

As the Internet has become increasingly popular, more and more content items, such as advertisements, are being distributed on web pages in order to reach a growing audience of Internet users. The distribution can be based, for example, on a keyword search query, or it can be based on the content of a publisher's website. The relevant content items can be displayed to the user, and the user can interact (e.g., click on) with particular content items.

Current systems may use an auction process to identify relevant content items to assign an advertisement to an available position on a web page. The position in which these advertisements are placed may increase the visibility, and thus, the success of the advertisements. For example, an advertisement placed at the top of a page ahead of other advertisements may be more visible to viewers than an advertisement placed between several other advertisements. However, merely speculating about which positions to place the advertisements can lead to a suboptimal placement of the advertisements.

SUMMARY

Disclosed herein are systems and methods for placing a content item. In one implementation, a determination is made as to content item rankings of a plurality of content items. Another determination is made as to location rankings of a plurality of content item locations. One of the plurality of content items is associated with one of the plurality of locations based upon the location rankings and content item rankings.

In another implementation, a determination is made as to a first series of location rankings for one or more content item locations based on content item location data. Another determination is made as to a first series of content item rankings for one or more content items based on content item data. One of the content items having a first content item ranking is associated with one of the content item locations having a first location ranking.

In another implementation, a content item engine is configured to determine content item rankings of a plurality of content items. A content item location engine is configured to determine location rankings of a plurality of content item locations. A content item rendering engine is configured to associate one of the plurality of content items with one of the plurality of content item locations based upon the location rankings and content item rankings, and render the plurality of content items in the associated content item location on a content page.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
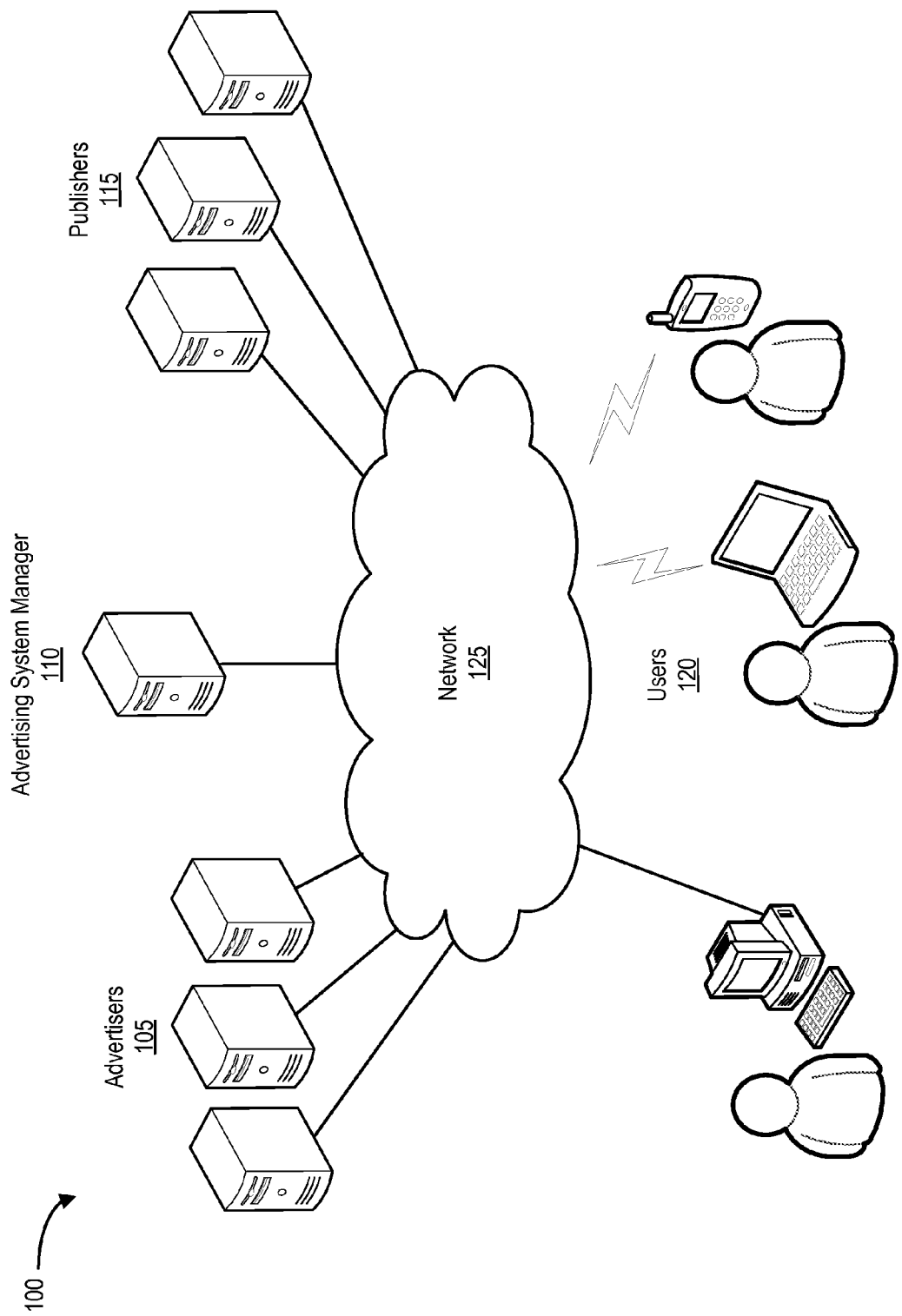
FIG. 1 is a block diagram of an example online advertising system.

FIG. 1 is a block diagram of an example online advertising system 100. In some implementations, one or more advertisers 105 can directly, or indirectly, enter, maintain, and track advertisement information in an advertising management system 110. The advertisements can be in the form of graphical advertisements, such as banner advertisements, text only advertisements, image advertisements, audio advertisements, video advertisements, advertisements combining one of more of any of such components, etc. The advertisements can also include embedded information, such as a links, meta-information, and/or machine executable instructions. One or more publishers 115 can submit requests for advertisements to the system 110. The system 110 responds by sending advertisements to the requesting publisher 115 for placement on one or more of the publisher's web properties (e.g., websites and other network-distributed content). Though reference is made to advertisements, other forms of content can be served by the system 110.

Other entities, such as users 120 and the advertisers 105, can provide usage or interaction information to the system 110, such as, for example, whether or not a conversion or click-through related to an advertisement has occurred.

A click-through can occur, for example, when a user of a user device, selects or "clicks" on an advertisement. The click-through rate can be a performance metric that is obtained by dividing the number of users that clicked on the advertisement or a link associated with the advertisement by the number of times the advertisement was delivered. For example, if an advertisement is delivered 100 times, and three persons clicked on the advertisement, then the click-through rate for that advertisement is 3%. A "conversion" occurs when a user, for example, consummates a transaction related to a previously served advertisement. What constitutes a conversion may vary from case to case and can be determined in a variety of ways.

This usage information can include measured or observed user behavior related to advertisements that have been served. The usage information can also include usage information that relates to how many clicks have occurred at particular locations historically on a page. The system 110 performs financial transactions, such as crediting the publishers 115 and charging the advertisers 105 based on the usage information. An example of such a system is AdWords™ offered by Google, Inc. (Mountain View, Calif.).

In some online advertising systems, advertisers can pay for their advertisements on a Cost-Per-Click (CPC) basis. A common way for advertisers to set a CPC is to take a target Cost-Per-Impression (CPI) and divide it by an average Click-Through-Rate (CTR).

A computer network 125, such as a local area network (LAN), wide area network (WAN), the Internet, or a combination thereof, connects the advertisers 105, the system 110, the publishers 115, and the users 120.

One example of a publisher 115 is a general content server that receives requests for content (e.g., articles, discussion threads, music, video, graphics, search results, web page listings, information feeds, etc.), and retrieves the requested content in response to the request. The content server can submit a request for advertisements to an advertisement server in the system 110. The advertisement request can include a number of advertisements desired. The advertisement request can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the advertisements provided by the system 110. This combined content and advertisements can be sent to the user that requested the content for presentation in a viewer (e.g., a browser or other content display system). The content server can transmit information about the advertisements back to the advertisement server, including information describing how, when, and/or where the advertisements are to be rendered (e.g., in HTML or JavaScript™).

Another example publisher 115 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999. Search results can include, for example, lists of web page titles, snippets of text extracted from those web pages, and hypertext links to those web pages, and can be grouped into a predetermined number of (e.g., ten) search results.

The search service can submit a request for advertisements to the system 110. The request can include a number of advertisements desired. This number can depend on the search results, the amount of screen or page space occupied by the search results, the size and shape of the advertisements, etc. In some implementations, the number of desired advertisements will be from one to ten, or from three to five. The request for advertisements can also include the query (as entered or parsed), information based on the query (such as geo-location information, whether the query came from an affiliate and an identifier of such an affiliate), and/or information associated with, or based on, the search results. Such information can include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with one or more of the advertisements provided by the system 110. This combined information can then be forwarded to the user that requested the content. The search results can be maintained as distinct from the advertisements, so as not to confuse the user between paid advertisements and presumably neutral search results.

Finally, the search service can transmit information about the advertisement and when, where, and/or how the advertisement was to be rendered back to the system 110.

As can be appreciated from the foregoing, the advertising management system 110 can serve publishers 115, such as content servers and search services. The advertising management system 110 permits serving of advertisements targeted to documents served by content servers. For example, a network or inter-network can include an advertisement server serving targeted advertisements in response to requests from a search service with advertisement spots for sale. Suppose that the inter-network is the World Wide Web. The search service can crawl much or all of the content. Some of this content will include advertisement spots (also referred to as "inventory") available. More specifically, one or more content servers can include one or more documents. Documents can include web pages, email, content, embedded information (e.g., embedded media), meta-information and machine executable instructions, and advertisement spots available. The advertisements inserted into advertisement spots in a document can vary each time the document is served or, alternatively, can have a static association with a given document.

In one implementation, the advertising management system 110 can render one or more advertisements on a content page. The advertisement can, for example, be rendered in one or more location slots and blocks on the content page. The advertisements can be rendered according to one or more performance metrics associated with the advertisements as well as interaction rates associated with the location slots and blocks.

Figure 2:
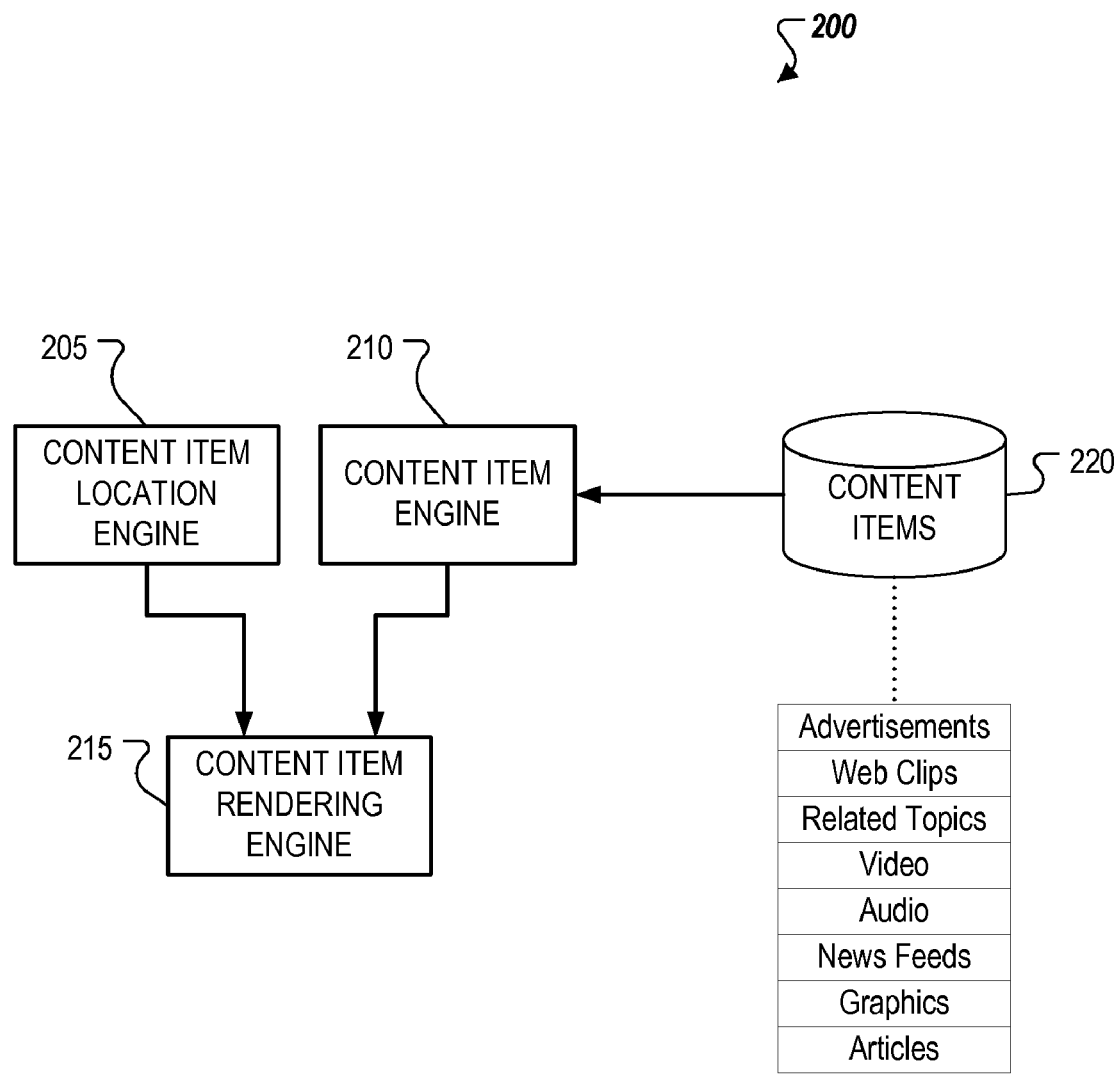
FIG. 2 is a block diagram of an example content item placement system.

FIG. 2 is a block diagram of an example content item placement system 200. The content item placement system 200 can, for example, be implemented in a computer device or one or more computer devices connected through a network, e.g., a LAN or a WAN, such as the Internet. The content item placement system 200 can, for example be implemented in the advertising system manager 110, which can be implemented in a computing system. The one or more computing devices can, for example, include memory devices storing processing instructions and processing devices for executing the processing instructions. An example computing system is shown and described with reference to FIG. 8. Other implementations, however, can also be used.

The content item placement system 200 can include a content item location engine 205, content item engine 210, and a content item rendering engine 215. The content item location engine 205, content item engine 210, and content item rendering engine 215 can, for example, be distributed among a plurality of computer devices, e.g. server computers communicating over a network, or can be implemented on a single computer, e.g., as multiple threads on a server computer. Other implementation architectures can also be used. The content item location engine 205, content item engine 210, and content item rendering engine 215 can, for example, be implemented in software, such as executable object code, interpreted script instructions, or in combinations of executable and interpreted instructions. Other software and/or hardware implementations can also be used.

In one implementation, an example publisher 115 in an example implementation of an online advertising system 100 is a search service. A search service can receive a search query from a user for search results. The search service can submit the search query to the advertising management system 110 that can be used to identify potentially relevant content items, e.g., advertisements, from a content items database 220. For example, a relevant content item from the content items database 220 can be one of a variety of different content item types, e.g., advertisements, video, audio, text, news feeds, digital print, images, etc., that is determined to be relevant to one or more keywords in a search query.

In another implementation, an example publisher 115 in an example implementation of an online advertising system 100 is a general content server. A general content server can receive a request for content items, e.g., advertisements, articles, discussion threads, music, video, graphics, search results, web page listings, information feeds, related topics, etc., from the content items database 220 and retrieve the requested content in response to the request.

Figure 3:
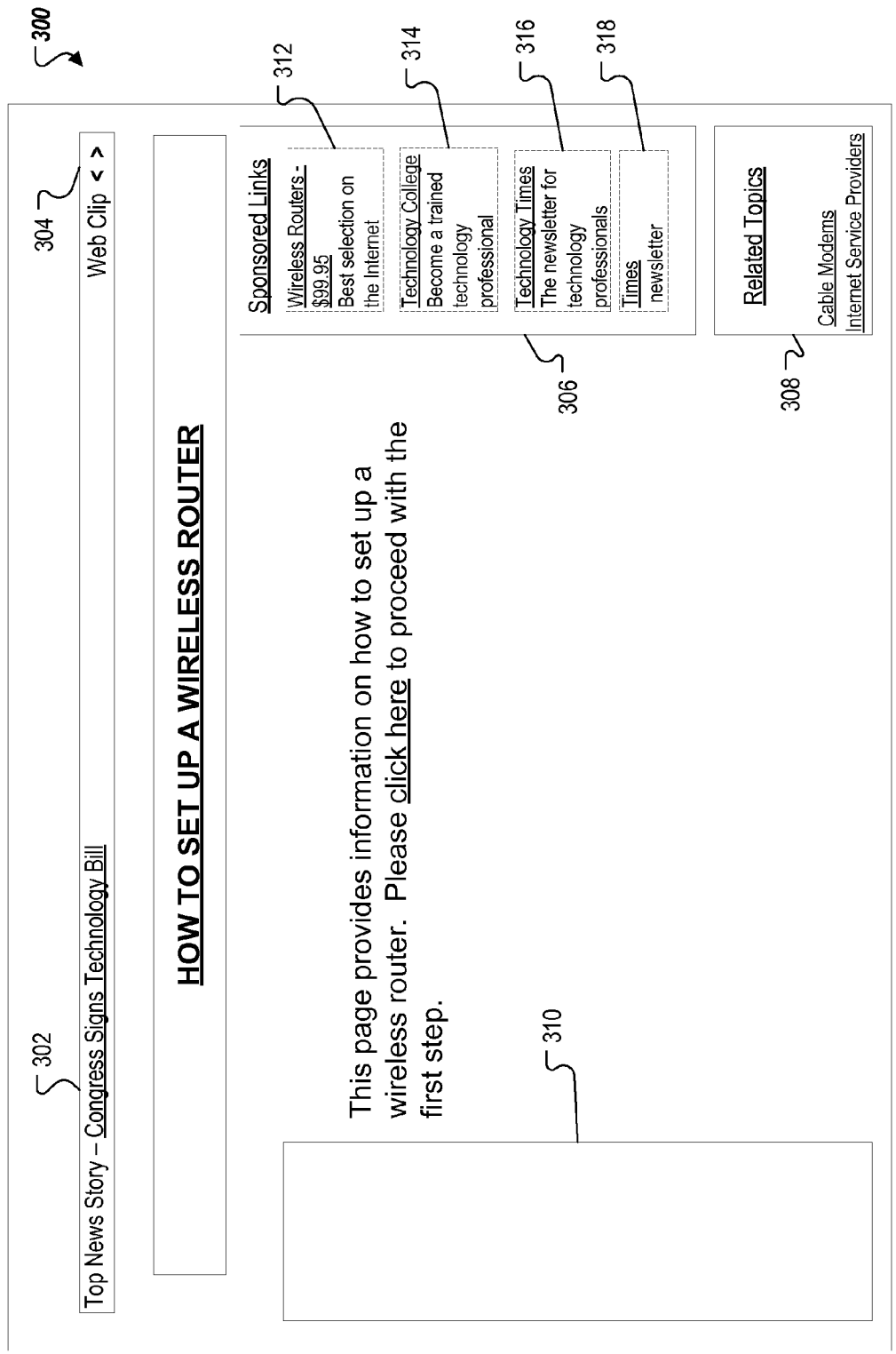
FIG. 3 is an example user interface for a content page.

FIG. 3 is an example user interface for a content page 300 that can display the relevant content items from the content items database 220 to a user 120. For example, the content page 300 can include multiple locations 302, 306, 308, 310, e.g. content item location blocks, to display one or more identified content items to a user. Each location block can contain one or more location slots. For example, location block 306 includes four location slots 312, 314, 316, 318.

In one implementation, the content item location blocks 302, 306, 308, 310 can be arranged in any order on the content page 300. The location blocks 302, 306, 308, 310 can be of different sizes, shapes, and can be located at different page locations. The location blocks 302, 306, 308, 310 can, for example, be arranged into a single block of slots, several blocks containing multiple slots, or as one individual block per slot.

In one implementation, the content item engine 210 can determine content item rankings for a plurality of content items. The plurality of content items can be stored in the content items database 220 and can include advertisements, articles, discussion threads, music, video, graphics, search results, web page listings, information feeds, related topics, etc. The content items database 220 can store one or more performance metrics associated with each content item. The content items database 220 can, for example, store performance metrics such as the click-through rate or conversion rate associated with each content item.

The content item engine 210 can determine content item rankings by determining a performance value based on one or more performance metrics for each of the content items. For example, the content item engine 210 can determine a performance value by using only the click-through rates associated with each advertisement. The content item engine 210 can then rank the content items based on the performance values.

For example, suppose four advertisements, Ad1, Ad2, Ad3, and Ad4 were associated with click-through rates of 4%, 3%, 2%, and 1% respectively. The content item engine 210 can determine a performance value based on the formula:

Performance value=click-through rate*2

The performance values of the four advertisements Ad1, Ad2, Ad3, and Ad4, therefore are 0.08, 0.06, 0.02, and 0.01 respectively. The content item engine 210 can rank the advertisements in decreasing order of performance value. Therefore, Ad1 would be ranked first, followed by Ad2 ranked second, Ad3 ranked third, and Ad4 ranked fourth.

In one implementation, the content items can be ranked using other formulas and other performance metrics, such as the cost-per-click associated with each advertisement, or any combination of performance metrics.

In one implementation, the content item location engine 205 can determine location rankings of a plurality of content item location slots, 312, 314, 316, 318 on the content page 300. The content item location slots, 312, 314, 316, 318 can be stored in the content items database 220 and can include positions on the content page 300 to display one or more identified content items to a user.

In one implementation, the content item location engine 205 can determine the location rankings of the content item location slots, 312, 314, 316, 318 by ranking the plurality of content item location slots, 312, 314, 316, 318 based on content item location data. The content item location data can, for example, include one or more interaction rates associated with the content item location slots.

In one implementation, an interaction rate associated with the content item location slots and stored in the content items database 220 can include one or more click-through rates associated with each location slot. The one or more click-through rates can, for example, include actual click-through rates or predicted click-through rates.

In one implementation, the content item location engine 205 can determine the location rankings of the content item location slots, 312, 314, 316, 318 according to a location_multiplier associated with each slot, which can be calculated according to the following formula:

Location_multiplier(location)=actual_*ctr*(location)/ quality_*ctr*(location)

Where the actual_ctr is the average click-through rate of all content items in a particular location, and the quality_ctr is the average predicted click-through rate for all the content items in a particular location. The actual_ctr as described above is the number of clicks on all content item in the particular location divided by the number of times the content items were displayed in the particular location.

The actual_ctr can be calculated as follows:

actual_*ctr*(location)=number of clicks from content items in the location/number of content item impressions in the location The quality_ctr can be calculated as follows:

quality_*ctr*(location)=sum of predicted click-through rates for content items shown in the location/ number of content item impressions in the location For example, content item location slot 312 can have an actual click-through rate of ten percent (10%) for advertisements displayed in the content item location slot 312. The actual click-through rates of content item location slot 312 can indicate that a user clicks on advertisements displayed to the user in the content item location slot 312 ten percent (10%) of the time.

The following actual click-through rates can, for example, be associated with the content item location slots in location block 306 on a content page 300: ten percent (10%) for content item location slot 312; five percent (5%) for content item location slot 314; one and a half percent (1.5%) for content item location slot 316; and one percent (1%) for content item location slot 318. Therefore, a user may be more likely to click on a content item in content item location slot 312, based on the higher click-through rate associated with the content item location slot 312. The actual click-through rates for the slots can, for example, be based on users' historical click-through data and can be stored in the user accounts database 205.

In one implementation, the quality_ctr can be calculated using a machine learning algorithm that continually predicts click-through rates, i.e., predicted click-through rates, of content items based on quality and historical data associated with the content items. These click-through rate predictions can be independent of the slot in which the content item is to be displayed.

In one implementation, the predicted click-through rate is an average over all slots in which the content item could be displayed. In another implementation, the predicted click-through rate would be the expected click-through rate if the content item is to be displayed in the top slot.

The location_multiplier can then be determined by comparing the average actual click-through rate of content items displayed in the slot with the average slot-independent predicted click-through rate of content items in the slot. For example, suppose the average predicted click-through rates for the content items shown in the location slots are: four percent (4%) for content items displayed in location slot 312; three percent (3%) for content items displayed in location slot 314; two percent (2%) for content items displayed in location slot 316; and one percent (1%) for content items displayed in location slot 318. The location_multiplier of content item location slots 302, 306, 308, 310 can be calculated as follows:

location_multiplier(312)=10%/4%=2.5 location_multiplier(314)=5%/3%=1.67 location_multiplier(316)=1.5%/2%=0.75 location_multiplier(318)=1%/1%=1

Therefore, since the quality of the content items themselves have an effect on the content items' click-through rates, the click-through rates estimate is corrected by dividing out the component related to the quality, the "raw quality click-through rates" of the content item. The location_multiplier is the measure of the location performance used to determine which slot or location is the best, i.e., where the content item in the slot would be clicked on the most. The slots can then be ranked in order of decreasing location performance. Therefore, in the example above, the content item locations slots, 312, 314, 316, 318 can be ranked as follows:

1. Content Item Location Slot 312
2. Content Item Location Slot 314
3. Content Item Location Slot 318
4. Content Item Location Slot 316

In another implementation, the location multipliers can be calculated by evaluating all of the CTRs for each (ad, slot) pair, and this data can be used to separate out the ad-specific and slot-specific contributions to each CTR. For example, if for two ads and two slots, the following CTRs exist:

ad1, slot1: 20% over 10 impressions
ad2, slot1: 10% over 10 impressions
ad1, slot2: 5% over 10 impressions
ad2, slot2: 2.5% over 10 impressions The system 200 can directly deduce that ad1 has an average CTR of 10%, ad2 of 5%, and that slot1 has a location_multiplier of 2.0, and slot2 of 0.5.

In another implementation, each location block 302, 306, 308, 310 can include a location_multiplier. For example, each of the three blocks 302, 306, 308, 310 can, for example, be associated with a different actual click-through rate. Therefore, each of the location blocks 302, 306, 308, 310 can be associated with a multiplier. In one implementation, the location slots within a location block can be associated with a multiplier that can be computed by multiplying the multiplier of the block with the slot. For example, if the location block 306 had a multiplier value of "1.2," the multiplier for each of the location slots 312, 314, 316, 318 can be calculated by multiplying "1.2" by "2.5," "1.67," "0.75," and "1" respectively.

In one implementation, the actual click-through rates associated with the content item location blocks 302, 306, 308, 310 and the slots 312, 314, 316, 318 can be based on historical data associated with one or more users and one or more content items located at one time in the location blocks and location slots. For example, the content items database 220 can store historical data associated with all users who have interacted with the content page 300 as well as other content pages, and can include the total number of clicks and impressions for all the users and the content items associated with the clicks and impressions associated with the content items. For example, the total number of clicks and impressions can be associated with different content item types and different content item locations based on the users' historical data. In one implementation, an actual click-through rate can be calculated from the users' historical data by dividing the total number of clicks by the total number of impressions of a content item, e.g., CTR=Clicks/Impressions.

For example, to determine a click-through rate associated with a specific content item location, e.g. the top slot 312 in content item location block 306, the total number of past clicks and total number of past impressions can be retrieved from the content items database 220 that are associated with the top slot in content item location block 306. By way of example, users may have previously been displayed 100 advertisements in the top slot 312 in the content item location block 306 and the users may have clicked the advertisements in the top slot in content item location block 306 a total of three times. Therefore, the actual click-through rate for the top slot 312 in content item location block 306 can be 3/100=3%.

Other methods for determining actual click-through rates based on historical data associated with the content item locations can also be used. In one implementation, historical information related to users can be retrieved for a fixed past time window. For example, six months of historical clicks and impression information can be retrieved to determine the click-through rates.

In one implementation, the location data can be based on eye movement tracking studies. Therefore, the content item location engine 205 can determine the location_multiplier based on the eye movement tracking studies. For example, if the format of the content page 310 is known in advance, the eye movement tracking studies can be used to determine which portions of the content page 310 the eye is most frequency drawn. The location can then be ranked in order of decreasing location performance.

In another implementation, the location data can be based on mouse movement tracking, e.g. if users hover their mouse over a particular location on the page, a slot placed there would have high performance.

In one implementation, the content item rendering engine 215 can associate one of the plurality of content items with one of the plurality of content item locations, e.g., content item location slots 312, 314, 316, 318 based upon the location rankings and content item rankings. The content item rendering engine 215 can, for example, assign a content item having the highest content item ranking to a content item location having the highest location ranking. The content item rendering engine 215 can match each content item with the content item location slots that have the same rank in the location rankings. For example, as described above, Ad1 was ranked first, Ad2 second, Ad3 third, and Ad4 fourth. The content item ranked first, Ad1, would be placed in the location that has the first position, content item location slot 312. The content item ranked second, Ad2, would be placed in the location that has the second position, content item location slot 314. The content item ranked third, Ad3, would be placed in the location that has the third position, content item location slot 318. The content item ranked fourth, Ad4, would be placed in the location that has the fourth position, content item location slot 316.

1. Content Item Location Slot 312—Ad1
2. Content Item Location Slot 314—Ad2
3. Content Item Location Slot 318—Ad3
4. Content Item Location Slot 316—Ad4

In one implementation, the content item rendering engine 215 can render the plurality of content items in the associated content item location on a content page. The content item rendering engine 215 can render the identified content items in the content page 310 based on the determined placement. For example, the content rendering engine 215 can render Ad1 in content to item location slot 312, Ad2 in content item location slot 314, Ad4 in content item location slot 316, and Ad3 in content item location slot 318.

In one implementation, the format of the content item can be changed dynamically to fit the location slot. For example, the content rendering engine 215 can render a thumbnail version of a large image ad to fit into a small location slot.

In one implementation, the content rendering engine 210 can render the identified content items in the content page 310 along with other content. For example, as described with respect to FIG. 1, a publisher 115 can be a content server that can combine identified content items with one or more of the advertisements provided by an advertisement system 110. The combined content items and advertisements can be sent to the user that requested the content for presentation in a viewer (e.g., a browser or other content display system). The content server can, for example, transmit information including information describing how, when, and/or where the advertisements are to be rendered (e.g., in HTML, CSS, Java-Script™, etc.).

In one implementation, the content rendering engine 215 can assign the content item having the highest content item ranking to the content item location having the highest location ranking until each of the content items are associated with a content item location. In another implementation, the content rendering engine 215 can assign the content item having the highest content item ranking to the content item location having the highest location ranking until each of the content item locations is associated with a content item. Therefore, not all the locations would need to be filled. If there are more content items than locations, then only the top content items are rendered in the location slots. If there are more location slots than content items, some of the location slots depending on how they rank, can be empty and not include a content item.

In one implementation, a server, such as the content server, can render the identified content items in a content page 300 by serving code, e.g., HTML, CSS, etc., to a browser. For example, to render the identified content items based on the determined placement, the content server can alter the code to move a content item location block, e.g. 302, 306, 308, or 310, on a content page 300. The code for the content item location block can, for example, be inserted at a dynamically determined position within the code to change its location on the content page.

In another implementation, the same dynamic methods could be used to place the content items within each slot, in addition to position the blocks/slots on the page as described above.

In another implementation, the properties of the HTML "<div>" tag that is served to the content page can be altered so the browser displaying the content page will position the content item location in the determined placement. In another implementation, the properties of the CSS code that is served to the content page can be altered so the browser displaying the content page will position the content item location in the determined placement. In one implementation, the HTML and CSS code can be altered by using a server-side scripting language, e.g., Python or PHP, or a templating language. In another implementation, the content server can directly generate the appropriately formatted HTML and/or CSS code. In another implementation, the content item location can be dynamically rendered into an image that contains the content for the content page.

In another implementation, a client-side implementation can be used to render the identified content items in a content page based on the determined placement. In the client-side implementation, the content item location can be dynamically positioned/repositioned on the content page by utilizing a web scripting language that runs in the browser, e.g. Javascript. In another implementation, the content item location can be dynamically repositioned on the content page by utilizing other scripting languages or browser display technology, such as Flash, Adobe PDF, SVG, Java, or VRML.

For example, regardless of the scripting language, in one implementation, the code can position/reposition the content item location once at the load time of the content page. In another implementation, the code can dynamically reposition the content item location block in response to real-time changes made to the content of the content page by other code, e.g. a new email being received in a web-based email client.

Figure 4:
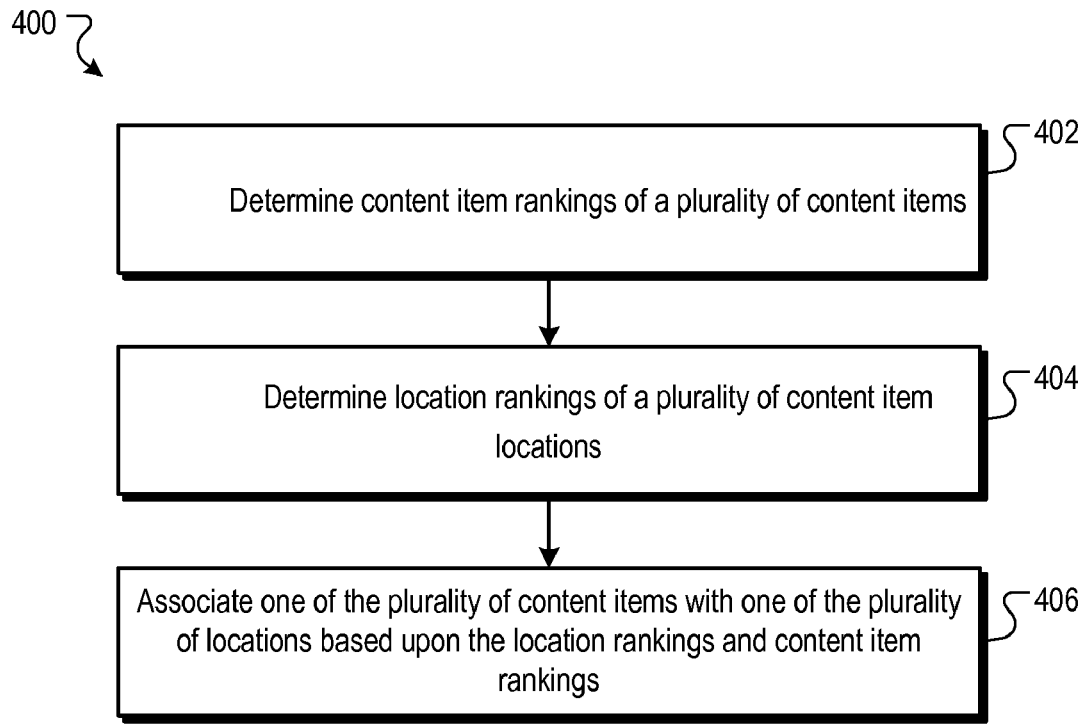
FIG. 4 is a flow diagram of an example process for placing a content item.

FIG. 4 is a flow diagram of an example process 400 for placing a content item. The process 400 can, for example, be implemented in the content item placement system 200. In one implementation, the content item placement system 200 can include a content item location engine 205, a content item engine 210, and a content item rendering engine 215. In another implementation, the content item placement system 200 can be integrated into an online advertising system 100.

Stage 402 determines content item rankings of a plurality of content items. For example, the content item engine 210 can determine content item rankings of a plurality of content items. Stage 404 determines location rankings of a plurality of content item locations. For example, the content item location engine 205 can determine location rankings of a plurality of content item locations. Stage 406 associates one of the plurality of content items with one of the plurality of locations based upon the location rankings and content item rankings. For example, the content item rendering engine 215 can associate one of the plurality of content items with one of the plurality of locations based upon the location rankings and content item rankings.

Figure 5:
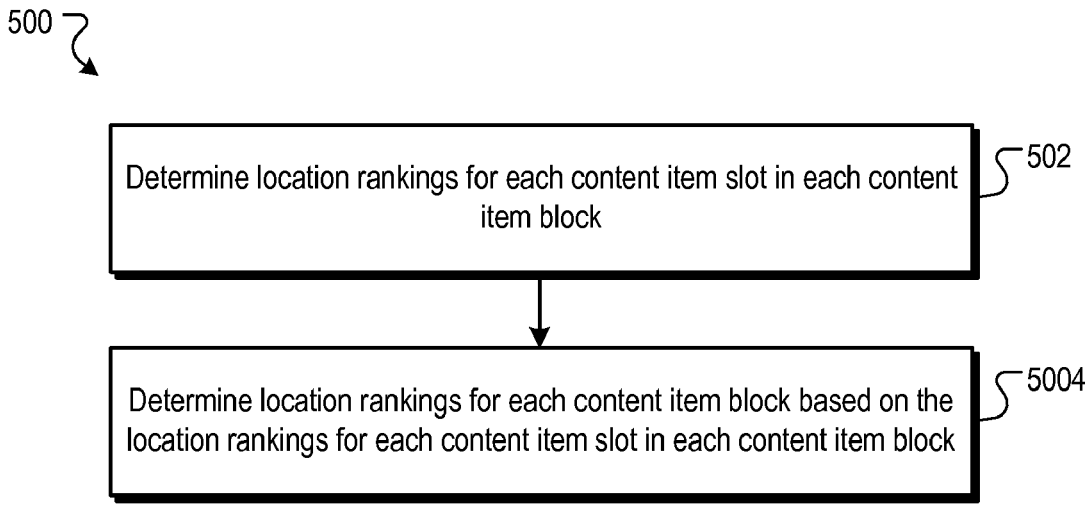
FIG. 5 is a flow diagram of an example process for determining content item location rankings.

FIG. 5 is a flow diagram of an example process 500 for determining content item location rankings. The process 500 can, for example, be implemented in the content item placement system 200. Stage 502 determines location rankings for each content item slot in each content item block. For example, the content item location engine 205 can determine location rankings for each content item slot in each content item block. Stage 504 determines location rankings for each content item block based on the location rankings for each content item slot in each content item block. For example, the content item location engine 205 can determine location rankings for each content item block based on the location rankings for each content item slot in each content item block.

Figure 6:
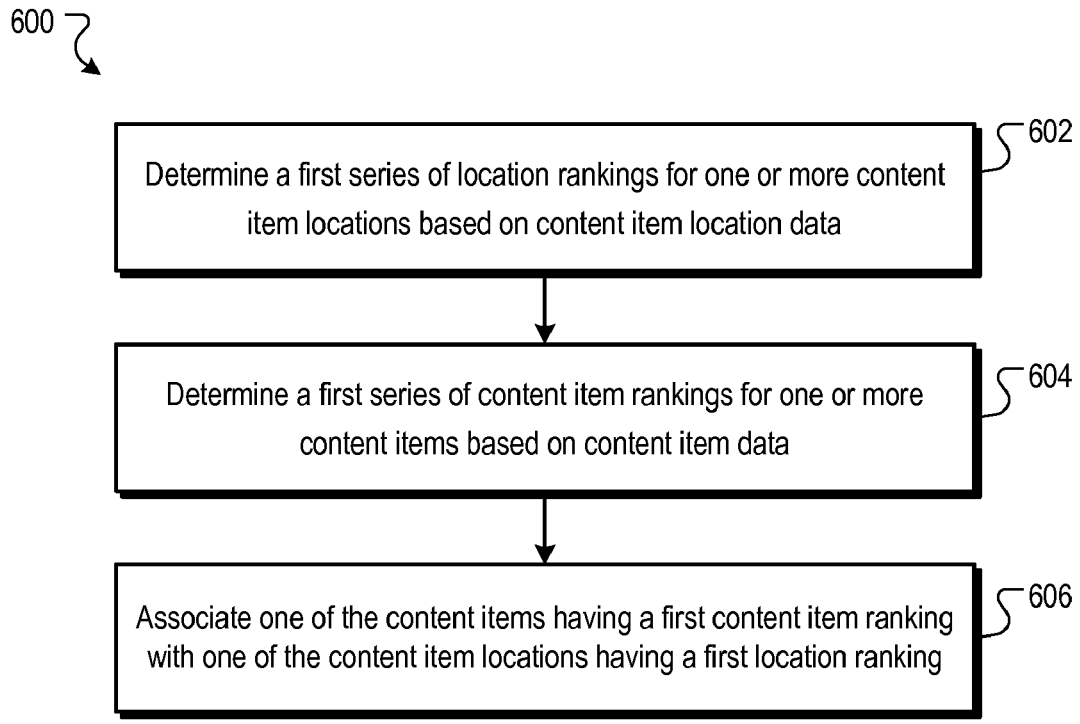
FIG. 6 is a flow diagram of another example process for placing a content item.

FIG. 6 is a flow diagram of an example process 600 for placing a content item. The process 600 can, for example, be implemented in the content item placement system 200. In one implementation, the content item placement system 200 can include a content item location engine 205, a content item engine 210, and a content item rendering engine 215. In another implementation, the content item placement system 200 can be integrated into an online advertising system 100.

Stage 602 determines a first series of location rankings for one or more content item locations based on content item location data. For example, the content item location engine 205 can determine a first series of location rankings for one or more content item locations based on content item location data. Stage 604 determines a first series of content item rankings for one or more content items based on content item data. For example, the content item engine 210 can determine a first series of content item rankings for one or more content items based on content item data. Stage 606 associates one of the content items having a first content item ranking with one of the content item locations having a first location ranking. For example, the content item rendering engine 215 can associate one of the content items having a first content item ranking with one of the content item locations having a first location ranking.

Figure 7:
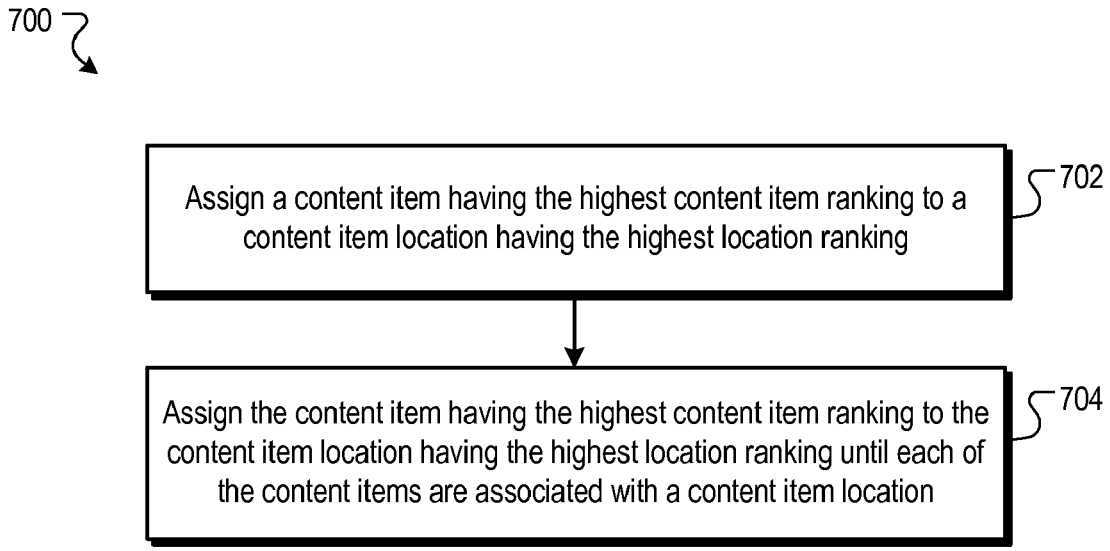
FIG. 7 is a flow diagram of an example process for assigning a content item having the highest content item ranking to a content item location.

FIG. 7 is a flow diagram of an example process 700 for assigning a content item having the highest content item ranking to a content item location. The process 700 can, for example, be implemented in the content item placement system 200.

Stage 702 assigns a content item having the highest content item ranking to a content item location having the highest location ranking. For example, the content item rendering engine 215 can assign a content item having the highest content item ranking to a content item location having the highest location ranking. Stage 704 assigns the content item having the highest content item ranking to the content item location having the highest location ranking until each of the content items are associated with a content item location. For example, the content item rendering engine 215 can assign the content item having the highest content item ranking to the content item location having the highest location ranking until each of the content items are associated with a content item location. The content rendering engine 215 can, for example, assign the content item having the highest content item ranking to the content item location having the highest location ranking.

Figure 8:
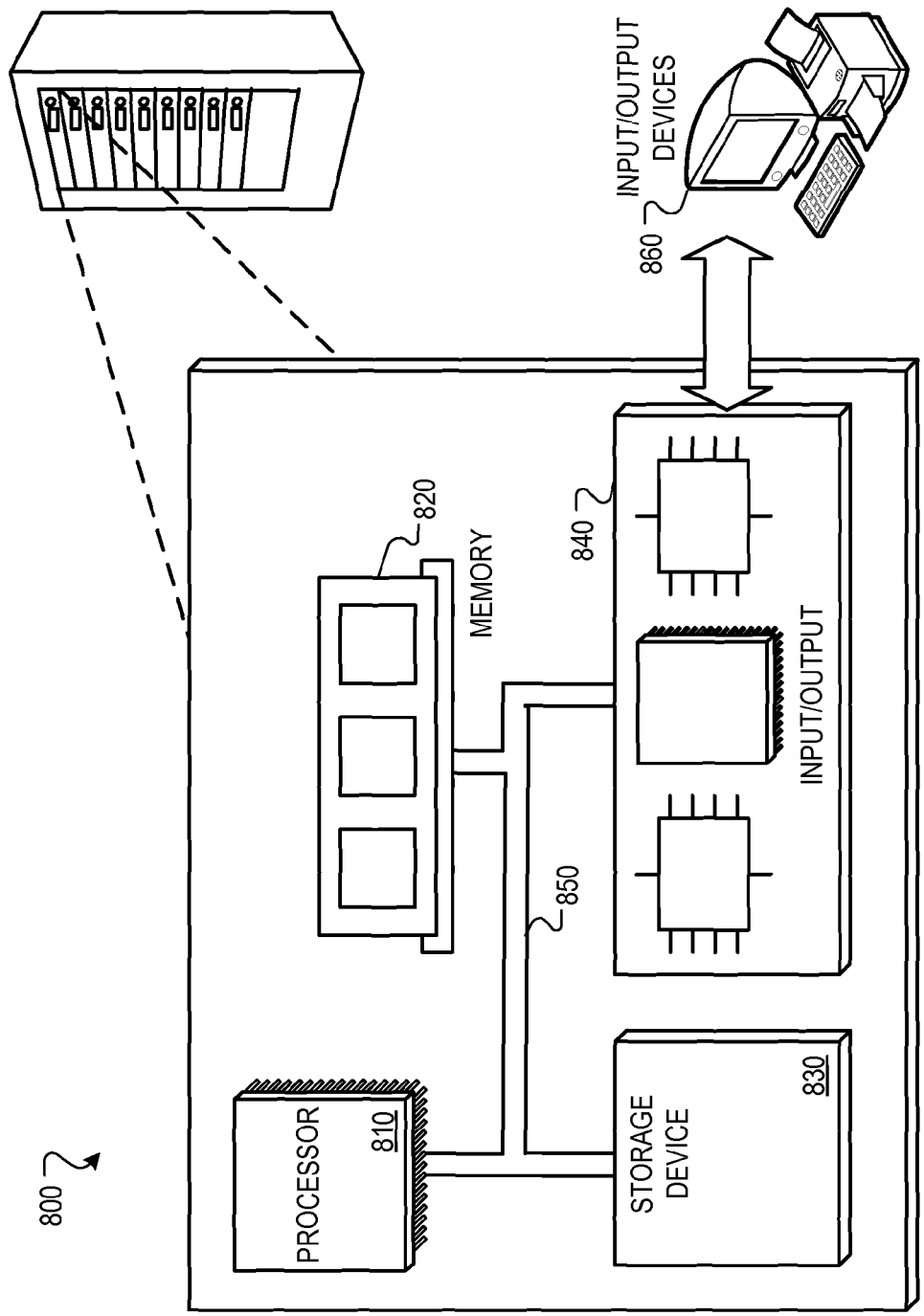
FIG. 8 is a schematic diagram of an example computer system that can be utilized to implement the systems and methods described herein.

FIG. 8 is block diagram of an example computer system 800. The system 800 includes a processor 810, a memory 820, a storage device 830, and an input/output device 840. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can, for example, include a hard disk device, an optical disk device, or some other large capacity storage device.

The input/output device 840 provides input/output operations for the system 800. In one implementation, the input/ output device 840 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 860. Other implementations, however, can also be used, such as mobile computing devices, mobile communication devices, set-top box television client devices, etc.

Although the above description refers to a content item such as an advertisement, content items such as video and/or audio files, web pages for particular subjects, news articles, etc. can also be used. For example, if a user clicks on a video file, then the owner or publisher of the video file can also generate revenue every time a user clicks on the video file. A threshold measure can also be determined for the video file according to one or more parameters associated with the video file, e.g., a click-through rate and/or a cost-per-click of the video file.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
    determining, using one or more processors, content item rankings of a plurality of content items, wherein the content item rankings are determined using a performance metric associated with each content item;
    determining location rankings of a plurality of content item locations on a content page, wherein the location rankings are determined using an interaction rate associated with each content item location;
    determining that a first content item location that is ranked above a second content item location in the location rankings is located on the content page below the second content item location;
    identifying a first content item that is ranked in the content item rankings at a position above a location rank of the second content item location in the location rankings; and
    assigning the identified first content item to the first content item location on the content page.

2. The method of claim 1, wherein determining location rankings comprises:
    obtaining an interaction rate for each of the plurality of content item locations; and
    ranking the plurality of content item locations based on the obtained interaction rates.

3. The method of claim 1, wherein each content item location is a content item slot located within a content item block, wherein the content item block includes one or more content item slots, and wherein location rankings of content item slots located within the content item block are based at least in part on an interaction rate associated with the content item block.

4. The method of claim 1, wherein determining location rankings of a plurality of content item locations comprises:
  determining location rankings for each content item slot in each of one or more content item blocks; and
  determining location rankings for each of the one or more content item blocks based on the location rankings for each content item slot in each respective content item block.

5. The method of claim 2, wherein the obtained interaction rate is based at least in part on an average click-through rate of content items presented in a particular content item location and an average predicted click-through rate for the particular content item location.

6. The method of claim 2, wherein the interaction rates associated with the content item locations comprise:
  one or more click-through rates.

7. The method of claim 1, wherein the content item location data comprises:
  location data based on eye movement tracking studies.

8. The method of claim 1, wherein associating one of the plurality of content items with one of the plurality of content item locations comprises:
  assigning a content item having a highest content item ranking to a content item location having a highest location ranking.

9. The method of claim 8, further comprising:
  assigning the content item having the highest content item ranking to the content item location having the highest location ranking until each of the content items is assigned to a content item location.

10. The method of claim 8, further comprising:
  assigning the content item having the highest content item ranking to the content item location having the highest location ranking until each of the content item locations is assigned to a content item.

11. The method of claim 1, further comprising:
  providing the one or more content items at the associated content item locations for presentation in a content page.

12. A method, comprising:
  determining a first series of location rankings for one or more content item locations based on content item location data, each content item location being a location on a specific web resource, and wherein the location rankings are determined using an interaction rate associated with each content item location;
  determining, using one or more processors, a first series of content item rankings for one or more content items based on content item data, each content item being eligible for presentation in a content slot on the web resource;
  determining that a first content item location that is ranked above a second content item location in the first series of location rankings is located on the specific web resource below the second content item location;
  identifying a first content item that is ranked in the first series of content item rankings at a position above a location rank of the second content item location in the first series of location rankings; and
  assigning the identified first content item to the first content item location on the specific web resource.

13. The method of claim 12, wherein the first series of location rankings is formatted as a preference list ordered from a most preferred ranking for placement of the first content item to a least preferred ranking.

14. The method of claim 12, wherein the content item location data comprises:
  one or more interaction rates associated with the content item locations.

15. The method of claim 14, wherein the one or more interaction rates associated with the content item locations comprise:
  one or more click-through rates.

16. The method of claim 12, wherein the content item location data comprises:
  location data based on mouse movement tracking studies.

17. The method of claim 12, wherein the one or more content items comprise:
  advertisements.

18. The method of claim 12, wherein the associating step comprises:
  assigning a content item having a highest content item ranking to a content item location having a highest location ranking.

19. The method of claim 18, further comprising:
  assigning the content item having the highest content item ranking to the content item location having the highest location ranking until each of the content items are associated with a content item location.

20. The method of claim 18, further comprising:
  assigning the content item having the highest content item ranking to the content item location having the highest location ranking until each of the content item locations is associated with a content item.

21. The method of claim 12, comprising:
  providing the one or more content items at the associated content item locations for presentation in a content page.

22. A system comprising:
  one or more processors; and
  a computer-readable storage device having stored thereon instructions that, when executed by the one or more processors, cause the one or more processors to perform operations comprising:
    determining content item rankings of a plurality of content items, each content item being eligible for presentation in a content slot on a web resource, wherein the content item rankings are determined using a performance metric associated with each content item;
    determining location rankings of a plurality of content item locations, each content item location being a location on a specific web resource, and wherein the location rankings are determined using an interaction rate associated with each content item location;
    determining that a first content item location that is ranked above a second content item location in the location rankings is located on the specific web resource below the second content item location;
    identifying a first content item that is ranked in the content item rankings at a position above a location rank of the second content item location in the location rankings; and
    assigning the identified first content item to the first content item location on the specific web resource.

23. The system of claim 22, wherein the plurality of content items comprise advertisements.

24. A computer-readable storage device having stored thereon instructions that, when executed by one or more processors, cause the one or more processors to perform operations comprising:
- determining content item rankings of a plurality of content items, each content item being eligible for presentation in a content slot on a web resource, wherein the content item rankings are determined using a performance metric associated with each content item;
- determining location rankings of a plurality of content item locations, each content item location being a location on a specific web resource, and wherein the location rankings are determined using an interaction rate associated with each content item location; and
- determining that a first content item location that is ranked above a second content item location in the location rankings is located on the content page below the second content item location;
- identifying a first content item that is ranked in the content item rankings at a position above a location rank of the second content item location in the location rankings; and
- assigning the identified first content item to the first content item location on the specific web resource.

25. The system of claim 22, wherein determining location rankings comprises:
- obtaining an interaction rate for each of the plurality of content item locations; and
- ranking the plurality of content item locations based on the obtained interaction rates.

26. The system of claim 22, wherein each content item location is a content item slot located within a content item block, wherein the content item block includes one or more content item slots, and wherein location rankings of content item slots located within the content item block are based at least in part on an interaction rate associated with the content item block.

27. The system of claim 22, wherein determining location rankings of a plurality of content item locations comprises:
- determining location rankings for each content item slot in each of one or more content item blocks; and
- determining location rankings for each of the one or more content item blocks based on the location rankings for each content item slot in each respective content item block.

28. The system of claim 25, wherein the obtained interaction rate is based at least in part on an average click-through rate of content items presented in a particular content item location and an average predicted click-through rate for the particular content item location.

29. The system of claim 25, wherein the interaction rates associated with the content item locations comprise:
- one or more click-through rates.

30. The system of claim 25, wherein the content item location data comprises:
- location data based on eye movement tracking studies.

31. The system of claim 22, wherein assigning each content item to a corresponding location slot comprises:
- assigning a content item having a highest content item ranking to a content item location having a highest location ranking.

32. The system of claim 31, wherein the operations further comprise:
- assigning the content item having the highest content item ranking to the content item location having the highest location ranking until each of the content items is assigned to a content item location.

33. The system of claim 31, wherein the operations further comprise:
- assigning the content item having the highest content item ranking to the content item location having the highest location ranking until each of the content item locations is assigned to a content item.

34. The system of claim 22, wherein the operations further comprise:
- providing the one or more content items at the associated content item locations for presentation in a content page.

35. The storage device of claim 24, wherein determining location rankings comprises:
- obtaining an interaction rate for each of the plurality of content item locations; and
- ranking the plurality of content item locations based on the obtained interaction rates.

36. The storage device of claim 24, wherein each content item location is a content item slot located within a content item block, wherein the content item block includes one or more content item slots, and wherein location rankings of content item slots located within the content item block are based at least in part on an interaction rate associated with the content item block.

37. The storage device of claim 24, wherein determining location rankings of a plurality of content item locations comprises:
- determining location rankings for each content item slot in each of one or more content item blocks; and
- determining location rankings for each of the one or more content item blocks based on the location rankings for each content item slot in each respective content item block.

38. The storage device of claim 35, wherein the obtained interaction rate is based at least in part on an average click-through rate of content items presented in a particular content item location and an average predicted click-through rate for the particular content item location.

39. The storage device of claim 35, wherein the interaction rates associated with the content item locations comprise:
- one or more click-through rates.

40. The storage device of claim 35, wherein the content item location data comprises:
- location data based on eye movement tracking studies.

41. The storage device of claim 24, wherein assigning each content item to a corresponding location slot comprises:
- assigning a content item having a highest content item ranking to a content item location having a highest location ranking.

42. The storage device of claim 41, wherein the operations further comprise:
- assigning the content item having the highest content item ranking to the content item location having the highest location ranking until each of the content items is assigned to a content item location.

43. The storage device of claim 41, wherein the operations further comprise:
- assigning the content item having the highest content item ranking to the content item location having the highest location ranking until each of the content item locations is assigned to a content item.

44. The storage device of claim 22, wherein the operations further comprise:
- providing the one or more content items at the associated content item locations for presentation in a content page.

* * * * *

UNITED STATES PATENT AND TRADEMARK OFFICE
CERTIFICATE OF CORRECTION

| | | |
|---|---|---|
| PATENT NO. | : 8,229,915 B1 | Page 1 of 1 |
| APPLICATION NO. | : 11/868714 | |
| DATED | : July 24, 2012 | |
| INVENTOR(S) | : Matthew I. Lloyd, Stanley Chen and Michael Hochberg | |

It is certified that error appears in the above-identified patent and that said Letters Patent is hereby corrected as shown below:

Column 16, Line 61 at Claim 44; replace:
"44. The storage device of claim 22, wherein the operations" with
-- 44. The storage device of claim 24, wherein the operations --

Signed and Sealed this
Second Day of October, 2012

David J. Kappos
*Director of the United States Patent and Trademark Office*